(No Model.)
A. B. SMITH.
SWATH BOARD FOR MOWING AND REAPING MACHINES.
No. 398,853. Patented Mar. 5, 1889.
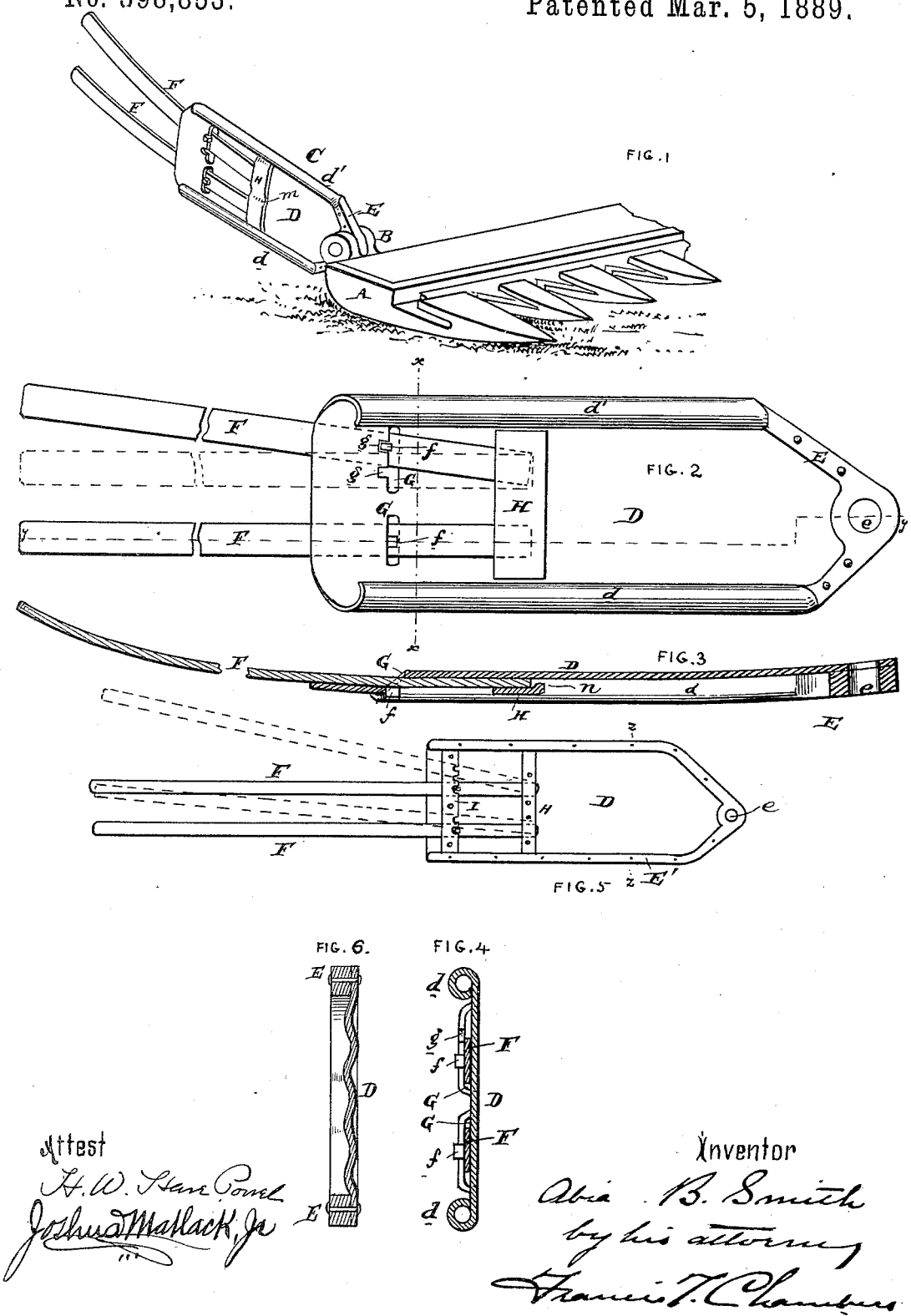

UNITED STATES PATENT OFFICE.

ABIA B. SMITH, OF PITTSBURG, PENNSYLVANIA.

SWATH-BOARD FOR MOWING AND REAPING MACHINES.

SPECIFICATION forming part of Letters Patent No. 398,853, dated March 5, 1889.

Application filed February 26, 1887. Serial No. 228,971. (No model.)

*To all whom it may concern:*

Be it known that I, ABIA B. SMITH, of Pittsburg, county of Allegheny, State of Pennsylvania, have invented a new and useful Improvement in Swath-Boards for Mowing and Reaping Machines, of which the following is a true and exact description, due reference being had to the accompanying drawings, which form a part of this specification.

My invention relates to certain new and useful improvements in swath-boards for mowing-machines and similar harvesting implements, and is designed to lessen the ordinary cost of production of swath-boards, while at the same time obviating many of the objectionable features of those heretofore proposed.

In the accompanying drawings, illustrative of my invention, Figure 1 is a perspective view of the outer end of a finger-bar having attached thereto a swath-board made in accordance with my invention. Fig. 2 is a back view of the said swath-board. Fig. 3 is a longitudinal section through the same on the line $y\,y$ of Fig. 2. Fig. 4 is a cross-section on the line $x\,x$ of Fig. 2. Fig. 5 is a back view of a modification of my invention, and Fig. 6 is a cross-section of another modification.

Similar letters of reference indicate similar parts throughout the several views.

As illustrated in Fig. 1, my improved swath-board is adapted to be attached pivotally to the outer end of the finger-bar A of a mowing-machine or the like, between the rearwardly-projecting lugs B, or their equivalents. The main body D of the swath-board is formed of sheet metal, preferably steel, bent or stamped into suitable form. The form I have found most suited to the purposes of the invention is the inward curve, (more clearly shown in Fig. 3,) which has the function of aiding the divider-sticks in guiding the cut grass inwardly and of lessening the strain that would otherwise be exerted on them. These divider-sticks are also of similar sheet metal, and are so connected with the main body of the swath-board as to present no obstruction to the free passage of the grass over its front surface. The said divider-sticks, being of considerable resiliency, are adapted to yield to extraordinary resistances, thereby lessening the strain that would be otherwise imposed upon the pivot-joint B, and afterward returning to their original shape. The curvature and relation of parts between the main body of the sheet-metal swath-board and divider-sticks are therefore such as to oppose comparatively little resistance to the draft of the machine and to the passage of the grass over the front surface.

In the form of my invention illustrated in Figs. 1, 2, 3, and 4 the inner ends of the divider-sticks are passed through slots G G of the main body D, and are secured in place by the metallic strap H, attached to the outside of the body D. This strap is depressed at its center crosswise of its length, as shown at $m$, Fig. 1, and is also provided with the stop-lugs $n$, Fig. 3, thereby forming sockets, within which the inner ends of the divider-sticks rest.

The divider-sticks are provided with lugs $f\,f$, which prevent them from being drawn out of the slots G. It is evident that these lugs may be attached to the divider-sticks by riveting or otherwise after the latter are in place. The slots G G are provide, moreover, with auxiliary detent-slots $g\,g$, which permit the inclination of the divider-sticks to be varied at will, the lug $f$ engaging therein and retaining the stick in the adjustment chosen.

In the form of my invention shown in Fig. 5 the main body D of the swath-board is not slotted, but the divider-sticks are attached thereto by means of an additional strap, I, having detent-notches $g\,g$ and similar functions to the slots G $g$, hereinbefore described.

To still lessen the resistance to draft offered by the swath-board, preventing it from cutting into the ground, I provide it with a broad bearing-surface secured by bending the lower edge of the main body outwardly, as shown at $d$. This outward bending of the edge, also being away from the face of the swath-board, does not serve as an obstruction to the grass. In like manner the upper edge, $d'$, is bent outwardly. Both edges are thereby protected from being battered out of shape by stones and other obstructions met with in the operation of the machine, and at the same time the resistance of the swath-board to outward flexure is greatly increased, so as to add to its strength and stability.

I prefer to still further strengthen the sheet-metal body D by providing it with corrugations, as represented in Fig. 6, the corrugations being made longitudinal, so as not to interfere with or offer obstruction to the passing grass.

At the front edges or point of the swath-board I preferably secure, by rivets or otherwise, a wrought or cast metal fork, E, shaped to fit the front edge of the swath-board, and having a perforation, $e$, for the passage of a pivot-pin, whereby it may be connected to the lugs B. In this manner I obtain a strong and durable connection with the finger-bar, and the front edges of the sheet-metal body are also protected from the battering effect of stones or other obstructions, the said stones being, moreover, diverted from the main body by the inclined faces of the fork.

In Fig. 5 I have represented this fork as continued along the longitudinal edges of the main body D, so as to form wearing-shoes for it and to stiffen it.

Having thus described my invention, what I claim as new, and desire to protect by Letters Patent, is—

1. As a new article of manufacture, a swath-board formed of sheet metal, having its upper and lower edges rolled over outwardly to strengthen and stiffen it laterally without obstructing the passage of the grass over the inner face of the swath-board.

2. As a new article of manufacture, a swath-board formed of a single thickness of sheet metal cut and bent to suitable form, and having a metal fork secured to its point, the fork being of the outline of the front end of the board, so as to stiffen that edge.

3. As a new article of manufacture, a swath-board formed of sheet metal, having its upper and lower edges rolled over outwardly to strengthen and stiffen it laterally without obstructing the passage of the grass over the inner face of the swath-board, and having a metal fork, E, secured to and shaped to fit and re-enforce its front end.

4. The combination, with a swath-board, of a socket, H, secured to the outside of said board, a dividing-stick having a lug, $f$, the forward end of said dividing-stick resting within said socket, and the swath-board being provided with a slot, G, or its equivalent, for engagement with the lug $f$, as and for the purpose specified.

5. The combination, with a swath-board, of a socket, H, secured to the outside of said board, a metal dividing-stick having a lug, $f$, the forward end of said stick resting within said socket, and the swath-board being provided with a slot, G, having detents $g$, or its equivalent, for engagement with the lug $f$ and for regulating its inclination, as and for the purpose specified.

6. As a new article of manufacture, a swath-board formed of sheet metal cut and bent to suitable form and having a metal fork secured to its point, the fork being of the outline of the front end of the board, so as to stiffen that edge, and the upper and lower edges of the board being re-enforced, as described.

7. As a new article of manufacture, a swath-board formed of sheet metal longitudinally corrugated and cut and bent to suitable form and having a metal fork secured to its point, the fork being of the outline of the front end of the board, so as to stiffen that edge, and the upper and lower edges of the board being re-enforced, as described.

ABIA B. SMITH.

Witnesses:
  GEO. F. WILLSON,
  A. B. SMITH, Jr.